United States Patent
Ona et al.

(10) Patent No.: US 11,108,056 B2
(45) Date of Patent: Aug. 31, 2021

(54) METHOD FOR PRODUCING FUEL CELL

(71) Applicant: TOYOTA JIDOSHA KABUSHIKI KAISHA, Toyota (JP)

(72) Inventors: Kunihito Ona, Okazaki (JP); Takahide Katagiri, Toyota (JP); Keisuke Miyanaga, Toyota (JP); Hiroshi Kinpara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/239,752

(22) Filed: Jan. 4, 2019

(65) Prior Publication Data

US 2019/0229346 A1 Jul. 25, 2019

(30) Foreign Application Priority Data

Jan. 22, 2018 (JP) .............................. JP2018-007974

(51) Int. Cl.
*H01M 8/0247* (2016.01)
*H01M 8/24* (2016.01)
(Continued)

(52) U.S. Cl.
CPC ....... *H01M 8/0247* (2013.01); *H01M 8/0206* (2013.01); *H01M 8/0273* (2013.01); *H01M 8/0276* (2013.01); *H01M 8/0286* (2013.01); *H01M 8/24* (2013.01); *H01M 8/2404* (2016.02); *H01M 8/247* (2013.01)

(58) Field of Classification Search
CPC ............. H01M 8/0247; H01M 8/2404; H01M 8/0206; H01M 8/0273; H01M 8/0276; H01M 8/0286; H01M 8/24; H01M 8/247
See application file for complete search history.

(56) References Cited

U.S. PATENT DOCUMENTS

2003/0082430 A1* 5/2003 Suzuki ................ H01M 8/0271
429/510

FOREIGN PATENT DOCUMENTS

JP 2004178978 A * 6/2004
JP 2007-123090 A 5/2007
(Continued)

OTHER PUBLICATIONS

EPO machine generated English translation of JP 2015-118810-A (Year: 2015).*

(Continued)

*Primary Examiner* — Christopher P Domone
*Assistant Examiner* — Kimberly Wyluda
(74) *Attorney, Agent, or Firm* — Dickinson Wright, PLLC

(57) ABSTRACT

Provided is a method for producing a fuel cell that can reduce the amount of an adhesive applied to join a pair of sheet-like separators together while also avoiding failures in the conveyance of the separators. A separator, which has a bent portion on the peripheral edge thereof and has a recess and a projection formed on one surface and the other surface, respectively, of the separator by the bent portion, is used. The conveying step includes gripping the bent portion at opposite ends of each separator using grippers. The seal portion forming step includes disposing an adhesive in the recess formed by the bent portion of one of the separators, and fitting the projection formed by the bent portion of the other separator in the recess.

5 Claims, 4 Drawing Sheets

(51) Int. Cl.
| | |
|---|---|
| *H01M 8/2404* | (2016.01) |
| *H01M 8/0276* | (2016.01) |
| *H01M 8/0286* | (2016.01) |
| *H01M 8/0273* | (2016.01) |
| *H01M 8/247* | (2016.01) |
| *H01M 8/0206* | (2016.01) |

(56) References Cited

FOREIGN PATENT DOCUMENTS

| | | | |
|---|---|---|---|
| JP | 2009-064734 A | | 3/2009 |
| JP | 2012195128 A | | 10/2012 |
| JP | 2015-118810 A | | 6/2015 |
| JP | 2016219166 A | | 12/2016 |
| JP | 2017-016830 A | | 1/2017 |
| KR | 20020056184 A | * | 7/2002 |

OTHER PUBLICATIONS

EPO machine generated English translation of JP-2004178978-A (Year: 2004).*
English translation of KR-20020056184-A obtained from Global Dossier (Year: 2002).*

* cited by examiner

CONVENTIONAL TECHNIQUES

CONVENTIONAL TECHNIQUES

CONVENTIONAL TECHNIQUES

METHOD FOR PRODUCING FUEL CELL

CROSS REFERENCE TO RELATED APPLICATIONS

The present application claims priority from Japanese patent application JP 2018-007974 filed on Jan. 22, 2018, the content of which is hereby incorporated by reference into this application.

BACKGROUND

Technical Field

The present disclosure relates to a method for producing a fuel cell.

Background Art

Conventionally, an invention related to an apparatus for conveying a metal separator for a fuel cell, a method for conveying a metal separator for a fuel cell, and a metal separator for a fuel cell has been known (see JP 2015-118810 A).

The invention disclosed in JP 2015-118810 A has been made in view of the demand for techniques to improve productivity by conveying a metal separator at fast speed while gripping the metal separator being conveyed so that it does not flip up in a headwind. An object of the invention disclosed in JP 2015-118810 A is to provide an apparatus for conveying a metal separator for a fuel cell that can convey the metal separator at fast speed.

To achieve such an object, JP 2015-118810 A discloses a conveying apparatus with the following configuration. Specifically, the conveying apparatus includes a pulling portion and a conveying portion. The pulling portion is adapted to grip to-be-gripped portions at opposite ends of a sheet-like metal separator for a fuel cell, using gripping members, and the gripping members are moved apart from each other so as to pull the metal separator outward. The conveying portion conveys the metal separator being pulled by the pulling portion.

According to the conveying apparatus disclosed in JP 2015-118810 A, a metal separator is conveyed while its opposite ends are being pulled. Therefore, the metal separator can be conveyed at fast speed without flipping up and thus deforming or deflecting from the conveying path while being conveyed. Thus, the productivity of fuel cells can be improved through high-speed conveyance of metal separators.

Further, JP 2015-118810 A discloses a configuration in which the to-be-gripped portions of the metal separator have protruding shapes so as to be latched by the gripping members (see FIG. 8(A) and paragraph 0058 of JP 2015-118810 A). According to such a configuration, when gripping members such as clamps are latched by the to-be-gripped portions of the metal separator so that the to-be-gripped portions are gripped by the gripping members, the to-be-gripped portions can be gripped more firmly than when to-be-gripped portions with flat shapes are gripped.

SUMMARY

Typically, a method for producing a fuel cell includes a step of disposing a membrane electrode assembly between a pair of metal separators on the anode side and the cathode side, and joining the pair of metal separators together using an adhesive, for example. In this step, the adhesive is put in a frame shape on the peripheral edge of one or each of the opposed surfaces of the pair of metal separators such that the adhesive surrounds the membrane electrode assembly, thereby forming a seal portion for sealing a space between the peripheral edges of the pair of metal separators.

The peripheral edges of the metal separators disclosed in JP 2015-118810 A that are joined together using the adhesive are flat. In such a case, the adhesive would flow along the flat surfaces of the peripheral edges of the pair of metal separators when they are joined together. Therefore, there is a possibility that the amount of the adhesive that is applied to from a seal portion for sealing a space between the peripheral edges of the pair of metal separators may become excessive.

In view of the foregoing, the present disclosure provides a method for producing a fuel cell that can reduce the amount of an adhesive applied to form a seal portion between the peripheral edges of a pair of sheet-like separators while also avoiding failures in the conveyance of the separators.

According to an aspect of the present disclosure, there is provided a method for producing a fuel cell, including: a conveying step of conveying each of sheet-like separators by gripping opposite ends of the separator in the longitudinal direction thereof using grippers; and a seal portion forming step of forming a seal portion by joining a pair of the separators together using an adhesive. The method uses, as each of the separators, a separator that has a bent portion on a peripheral edge thereof and has a recess and a projection formed on one surface and the other surface, respectively, of the separator. The conveying step includes gripping the bent portion at the opposite ends of each separator using the grippers. The seal portion forming step includes disposing the adhesive in the recess of one of the separators and fitting the projection of the other separator in the recess.

According to such an aspect, in the conveying step of conveying each of sheet-like separators by gripping opposite ends of the separator in the longitudinal direction thereof using grippers, the bent portion at the opposite ends of the separator in the longitudinal direction thereof can be gripped with the grippers. More specifically a recess and a projection are formed on the peripheral edges of one surface and the other surface, respectively, of the separator by the bent portion. Due to the projection and the recess, the frictional resistance between the grippers and the separator can be increased, thus avoiding a slip of the separator on the grippers. Accordingly, the sheet-like separator can be conveyed with tension applied thereto in the longitudinal direction, and thus, failures in the conveyance of the separator such that the separator flips up while being conveyed can be avoided.

Further, according to the aforementioned aspect, in the seal portion forming step of forming a seal portion by joining a pair of separators together using an adhesive, the seal portion can be formed by disposing an adhesive in the recess of one of the separators and fitting the projection of the other separator in the recess of the one of the separators. More specifically, one of the pair of separators has a recess formed by its bent portion on a surface that faces the other separator, and the other separator has a projection formed by its bent portion on a surface that faces the one separator.

As described above, as the adhesive is disposed in the recess of the one separator, and the projection of the other separator is fitted in the recess of the one separator, the adhesive is retained in the recess of the one separator so that a flow of the adhesive is prevented. Therefore, the amount of the adhesive applied can be reduced. In addition, as the seal portion is formed by the recess of the one separator and the projection of the other separator that are fitted together and by the adhesive disposed therebetween, the amount of the adhesive that is applied to form the seal portion can be reduced.

The method for producing a fuel cell in accordance with the aforementioned aspect may use, as each of the separators, a separator that has the bent portion formed continuously along the perimeter direction of the peripheral edge of the separator. Accordingly, in the seal portion forming step, the seal portion can be formed between the peripheral edges of the separators by the recess and the projection formed continuously along the perimeter directions of the respective separators by their bent portions and by the adhesive disposed therebetween.

The method for producing a fuel cell in accordance with the aforementioned aspect may use, as each of the separators, a separator that has the bent portion formed intermittently along the perimeter direction of the peripheral edge of the separator. Accordingly, in the seal portion forming step, the seal portion can be formed between the peripheral edges of the separators by the recess and the projection formed intermittently along the perimeter directions of the respective separators by their bent portions, by the adhesive disposed therebetween, and by the opposed surfaces of the pair of separators that are tightly attached together between the bent portions.

The method for producing a fuel cell in accordance with the aforementioned aspec may use, as each of the separators, a separator that has the bent portion formed along the entire perimeter of the peripheral edge of the separator. Accordingly, in the seal portion forming step, the seal portion can be formed along the entire perimeters of the peripheral edges of the separators.

The method for producing a fuel cell in accordance with the aforementioned aspect may use, as each of the separators, a separator having multiple bent portions formed thereon. Accordingly, in the conveying step, the multiple bent portions that are formed in frame shapes or annular shapes can be gripped with the grippers, and thus, the ends of the separator in the longitudinal direction thereof can be gripped more reliably. In addition, in the seal portion forming step, multiple seal portions can be formed between the peripheral edges of the separators so that the sealability of the seal portion can be improved.

According to any one of the aforementioned aspects of the present disclosure, a method for producing a fuel cell can be provided that can reduce the amount of an adhesive applied to form a seal portion between a pair of sheet-like separators while also avoiding failures in the conveyance of the separators.

DETAILED DESCRIPTION

Hereinafter, an embodiment of a method for producing a fuel cell in accordance with the present disclosure will be described with reference to the drawings.

Figure 1:
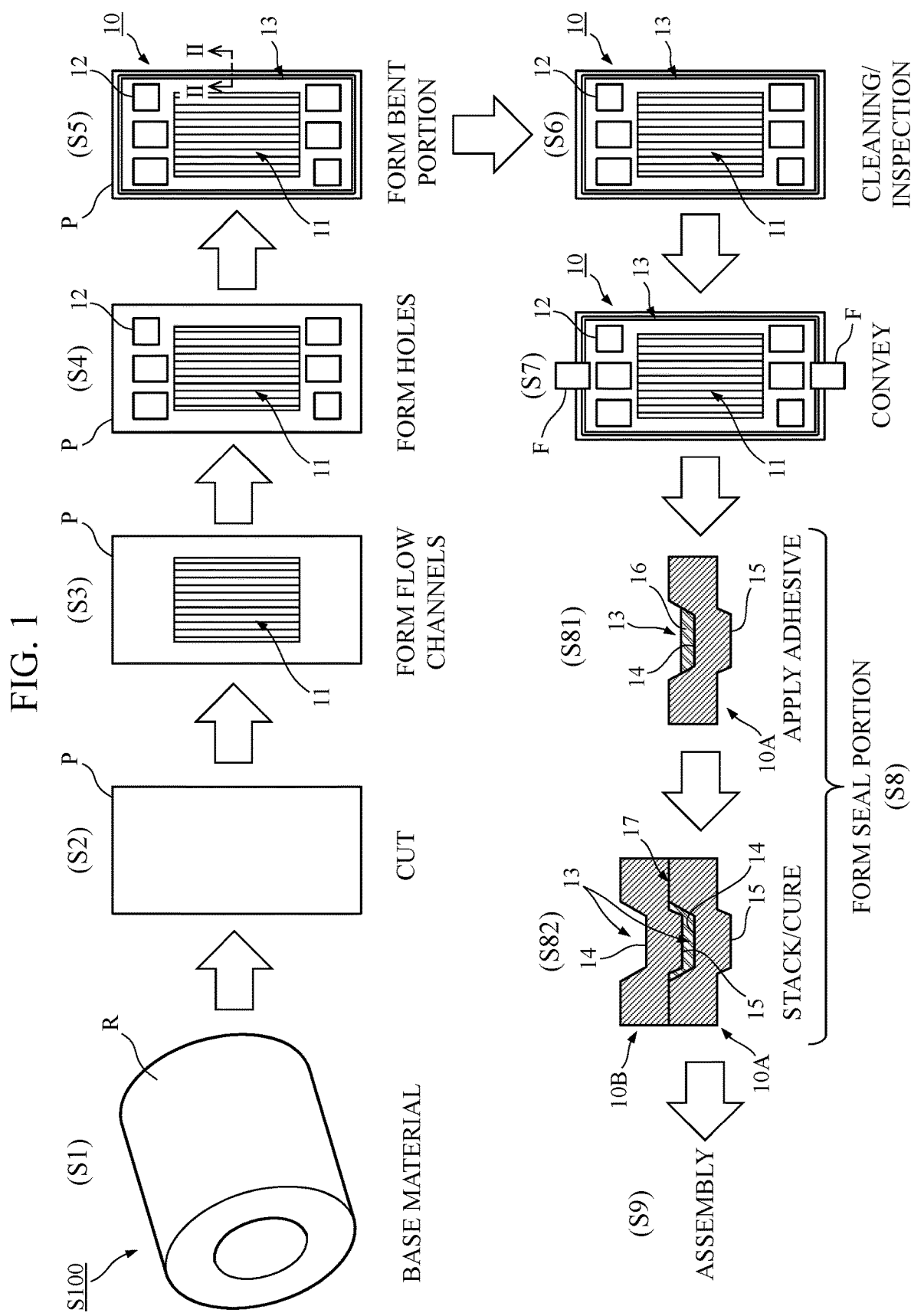
FIG. 1 is a schematic diagram illustrating an embodiment of a method for producing a fuel cell in accordance with the present disclosure.

FIG. 1 is a schematic diagram illustrating an embodiment of a fuel cell production method S100 in accordance with the present disclosure. A fuel cell produced using the fuel cell production method S100 of this embodiment is supplied with fuel gas, such as hydrogen gas, and oxidant gas, such as air containing oxygen, for example, and generates electricity through reactions between the fuel gas and the oxidant gas. The fuel cell is formed by stacking a plurality of unit cells each having a membrane electrode assembly and a pair of sheet-like metal separator 10 sandwiching the membrane electrode assembly therebetween, for example.

The fuel cell production method S100 of this embodiment includes, for example, a base material preparation step S1, a cutting step S2, a flow channel forming step S3, a hole forming step S4, a bent portion forming step S5, a cleaning/inspection step S6, a conveying step S7, a seal portion forming step S8, and an assembly step S9.

The fuel cell production method S100 of this embodiment has main characteristics in its conveying step S7 and seal portion forming step S8, which will be described in detail later. Therefore, in the fuel cell production method S100 of this embodiment, known steps can be used for the steps other than the conveying step S7 and the seal portion forming step S8.

The base material preparation step S1 is a step of preparing a sheet-like metal roll R, which is a base material of a separator 10 for a fuel cell, and setting the roll R so as to be able to continuously feed a metal sheet, for example. For the base material, for example, a metal sheet of stainless steel or the like can be used. The cutting step S2 is a step of cutting a strip-shaped metal sheet, which has been wound off from the sheet-like metal roll R, into a plurality of rectangular metal sheets P through punching, for example.

The flow channel forming step S3 is a step of forming reactant gas flow channels 11 in the shape of recessed grooves, which serve as flow channels for fuel gas or oxidant gas, in the rectangular metal sheet P obtained through the cutting step S2, using stamping, for example. The reactant gas flow channels 11 are formed in embossed patterns, for example, so that recesses are formed on one of the front and rear surfaces of the separator 10, while projections are formed on the other surface thereof. In addition, the reactant gas flow channels 11 are formed in a corrugated shape that forms projections and recesses on the front and rear surfaces of the separator 10, for example.

The hole forming step S4 is a step of forming a plurality of manifold holes 12 for suppling and discharging a fluid at one end and another end of the rectangular metal sheet P in the longitudinal direction thereof, respectively, using punching, for example. More specifically, the hole forming step S4 is a step of forming a pair of manifold holes 12 for supplying and discharging fuel gas, a pair of manifold holes 12 for supplying and discharging oxidant gas, and a pair of manifold holes 12 for supplying and discharging refrigerant, such as cooling water, for example.

Figure 2:
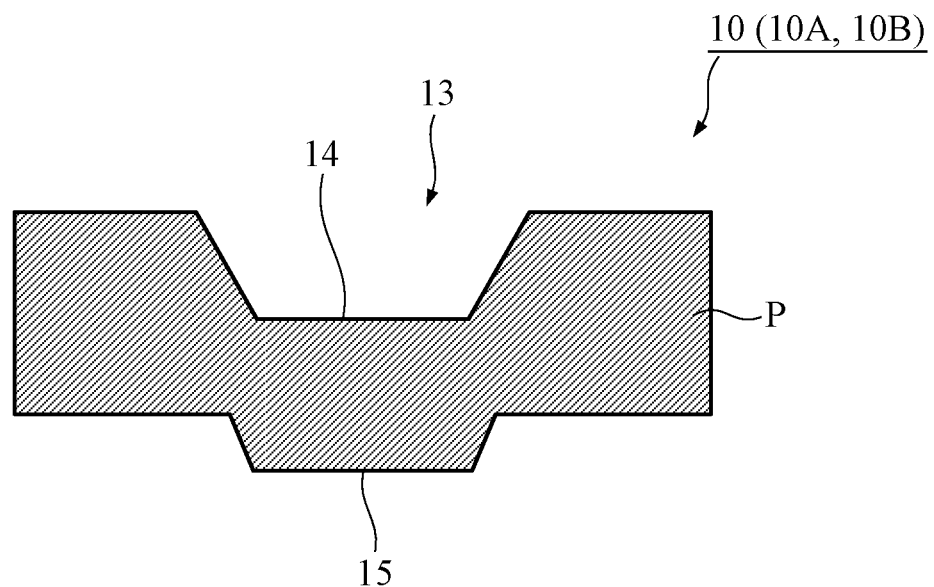
FIG. 2 is an enlarged schematic cross-sectional view of a separator for the fuel cell along line II-II of FIG. 1.

FIG. 2 is a schematic enlarged cross-sectional view of the separator 10 along line II-II of FIG. 1. The bent portion forming step S5 is a step of forming a bent portion 13 on the peripheral edge of the metal sheet P, using stamping, for example. Through this step, the separator 10 having the bent portion 13 on its peripheral edge can be obtained. The bent portion 13 is formed in an embossed pattern, for example, so that a recess 14 is formed on one of the surfaces of the separator 10 and a projection 15 is formed on the other surface thereof.

More specifically, each unit cell of the fuel cell includes a pair of separators 10 facing each other. One separator 10A of the pair of separators 10 is formed such that portions of the front and rear surfaces of the separator 10A that form the bent portion 13 are pushed out more in a direction opposite to the other opposed separator 10B than are the other portions of the front and rear surfaces of the separator 10A adjacent thereto. By the thus formed bent portion 13 of the one separator 10A, a recess 14 is formed on an opposed surface, which faces the other separator 10B, of one of the front and rear surfaces of the one separator 10A, and a projection 15 is formed on the other surface thereof that is opposite to the other separator 10B.

Meanwhile, the other separator 10B that faces the one separator 10A is formed such that portions of the front and rear surfaces of the separator 10B that form the bent portion 13 are pushed out more toward the one opposed separator 10A than are the other portions of the front and rear surfaces of the separator 10B adjacent thereto. By the thus formed bent portion 13 of the other separator 10B, a projection 15 is formed on the opposed surface, which faces the one separator 10A, of one of the front and rear surfaces of the other separator 10B, and a recess 14 is formed on the other surface thereof that is opposite to the one separator 10A.

That is, in the bent portion forming step S5, for example, a pair of separators 10 facing each other of a unit cell are formed and partially bent such that the peripheral edges of the front and rear surfaces of the separators 10 are pushed in the same direction and thus the bent portions 13 are formed. It should be noted that when the one separator 10A is the separator 10 on the anode side, the other separator 10B is the separator 10 on the cathode side. Meanwhile, when the one separator 10A is the separator 10 on the cathode side, the other separator 10B is the separator 10 on the anode side.

The dimensions of the bent portions 13 of the separators 10 can be decided such that when the projection 15 of the bent portion 13 of the other separator 10B is fitted in the recess 14 of the bent portion 13 of the one separator 10A, the opposed surfaces of the peripheral edges of the pair of separators 10 are tightly attached together, and a space for housing an adhesive 16 is formed between the projection 15 and the recess 14.

In addition, in the bent portion forming step S5, the bent portion 13 can be formed continuously along the perimeter direction of the peripheral edge of the separator 10, for example. Herein, a configuration in which the bent portion 13 is formed continuously along the perimeter direction of the peripheral edge of the separator 10 means that a linear or curved bent portion 13 that extends along at least one side edge of the separator 10 is formed.

Alternatively, in the bent portion forming step S5, the bent portion 13 may be formed along the entire perimeter of the peripheral edge of the separator 10, for example. In the example illustrated in FIG. 1, the bent portion 13 is formed continuously along the entire perimeter of the peripheral edge of the separator 10 that has an approximately rectangular shape in plan view, and is formed in a rectangular frame shape or a rectangular annular shape surrounding a reactive portion that is a region where the membrane electrode assembly is disposed.

Figure 3:
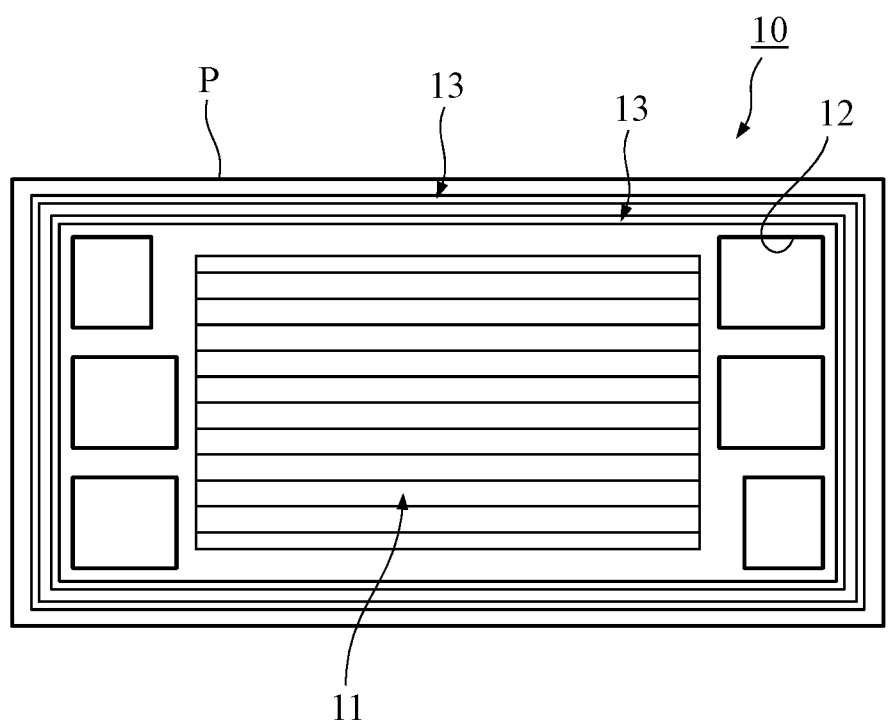
FIG. 3 is a schematic plan view illustrating an example of the separator formed in a bent portion forming step in FIG. 1.

FIG. 3 is a schematic plan view illustrating an example of the separator 10 formed in the bent portion forming step S5. In the bent portion forming step S5, multiple bent portions 13 may be formed on the peripheral edge of the separator 10, for example. More specifically, in the example illustrated in FIG. 3, two bent portions 13 that include an outer side bent portions 13 and an inner side bent portions 13, which have the same center and similar shapes, are formed on the peripheral edge of the separator 10. Alternatively, three or more bent portion 13 may be provided. The projections 15 formed by adjacent bent portions 13 may be located on the same surface or opposite surfaces of the front and rear surfaces of the separator 10.

Figure 4:
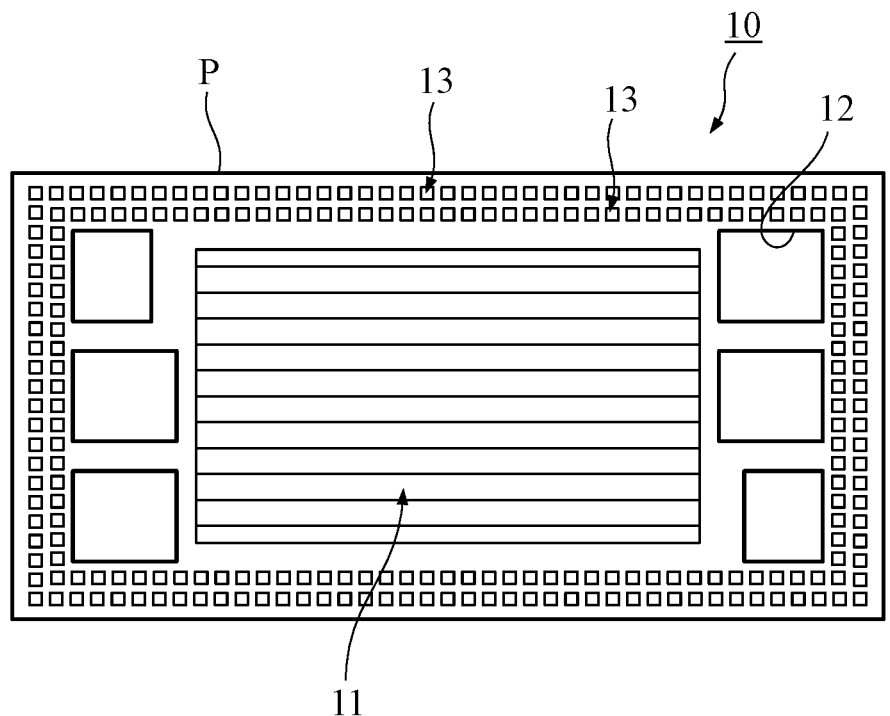
FIG. 4 is a schematic plan view illustrating another example of the separator formed in a bent portion forming step in FIG. 1.

FIG. 4 is a schematic plan view illustrating another example of the separator 10 formed in the bent portion forming step S5. In the bent portion forming step S5, the bent portion 13 may be formed intermittently along the perimeter direction of the peripheral edge of the separator 10, for example. In the example illustrated in FIG. 4, multiple bent portions 13 are formed along the peripheral edge of the separator 10, and each bent portion 13 is formed intermittently at intervals along the entire perimeter of the peripheral edge of the separator 10. More specifically, two bent portions 13, which include an outer side bent portion and an inner side bent portion, are formed in a rectangular frame shape on the peripheral edge of the separator 10, and each bent portion is 13 formed in a dashed line pattern along the entire perimeter of the peripheral edge of the separator 10.

It should be noted that the bent portion forming step S5 can be performed before the hole forming step S4 or concurrently with the flow channel forming step S3, for example.

As illustrated in FIG. 1, the separator 10 that has the bent portion 13 formed on its peripheral edge in the bent portion forming step S5 is sent to the cleaning/inspection step S6. In the cleaning/inspection step S6, for example, the separator 10 is cleaned with a cleaning solution or pure water and is then dried, and after that, the separator 10 is inspected through visual inspection, such as visual observation or image observation.

The conveying step S7 is a step of conveying the sheet-like separator 10 by gripping the opposite ends thereof in the longitudinal direction using grippers F. For the grippers F, fingers or chucks that are adapted to hold the ends of the separator 10 from its opposite sides in the thickness direction can be used, for example. The separator 10 conveyed in the conveying step S7 has the bent portion 13 on its peripheral edge, and has the recess 14 formed on one surface and the projection 15 formed on the other surface thereof due to the bent portion 13.

In the fuel cell production method S100 of this embodiment, the bent portion 13 at the opposite ends of the separator 10 in the longitudinal direction thereof is gripped using the grippers F in the conveying step S7. It should be noted that in the conveying step S7, projections or recesses of the grippers F may be allowed to engage the recess 14 or the projection 15 formed by the bent portion 13 of the separator 10.

The seal portion forming step S8 is a step of forming a seal portion 17 by joining the pair of separators together using the adhesive 16. In the seal portion forming step S8 of the fuel cell production method S100 of this embodiment, the adhesive 16 is disposed in the recess 14 formed by the bent portion 13 of the one separator 10A, and the projection 15 formed by the bent portion 13 of the other separator 10B is fitted in the recess 14 of the one separator 10A. More specifically, the seal portion forming step S8 includes an adhesive applying step S81 and a stacking/curing step S82, for example.

The adhesive applying step S81 is a step of, for example, applying the adhesive 16 to, of the pair of separators 10 having opposed surfaces that face each other when each unit cell of the fuel cell is formed, the separator 10A that has the recess 14 formed by the bent portion 13 on its opposed surface, and thus disposing the adhesive 16 in the recess 14 of the opposed surface. Although the adhesive 16 is not particularly limited, a heat curing adhesive can be used, for example.

The staking/curing step S82 is a step of, for example, disposing a membrane electrode assembly and a resin frame on the opposed surface of the one separator 10A, and staking the opposed surface of the other separator 10B such that it faces the opposed surface of the separator 10A, thereby disposing the membrane electrode assembly between the pair of separators 10. In addition, the stacking/curing step S82 is a step of fitting the projection 15, which is formed on the opposed surface of the other separator 10B by the bent portion 13 thereof, in the recess 14, which is formed on the opposed surface of the one separator 10A by the bent portion 13 thereof and has the adhesive 16 disposed therein, and curing the adhesive 16 through heating or the like, thereby forming the seal portion 17.

The seal portion 17 is formed such that it surrounds a reactive portion that is a region where the membrane electrode assembly is disposed between the pair of separators 10, for example, and is adapted to seal a space between the pair of separators 10 and thus prevent a leakage of a fluid from the reactive portion to the outside as well as prevent intrusion of a fluid into the reactive portion from the outside. Through the seal portion forming step S8, a plurality of unit cells that form a fuel cell can be obtained.

The assembly step S9 is a step of, for example, stacking a plurality of unit cells and putting the other parts thereto to form a fuel cell. It should be noted that the assembly step S9 and the stacking/curing step S82 can be performed concurrently. Through the aforementioned steps, a fuel cell can be produced.

Figure 5A:
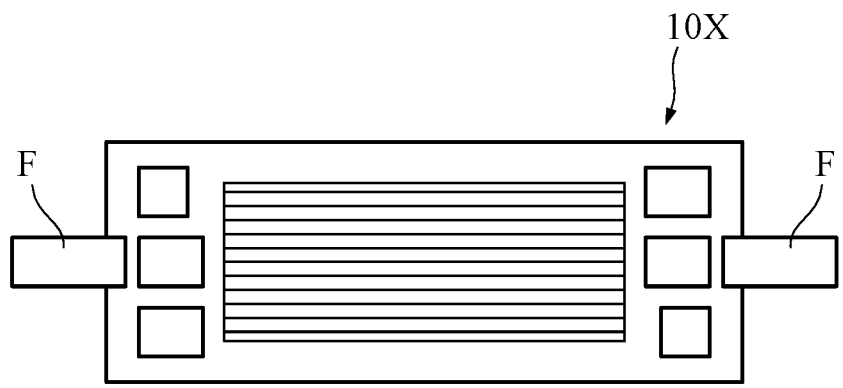
FIG. 5A is a schematic plan view illustrating a step of conveying a conventional separator for a fuel cell.
Figure 5B:
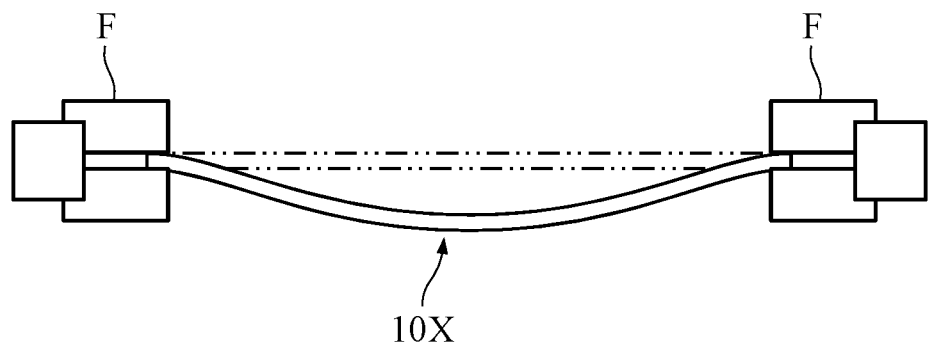
FIG. 5B is a schematic front view illustrating a step of conveying the conventional separator for the fuel cell.
Figure 5C:
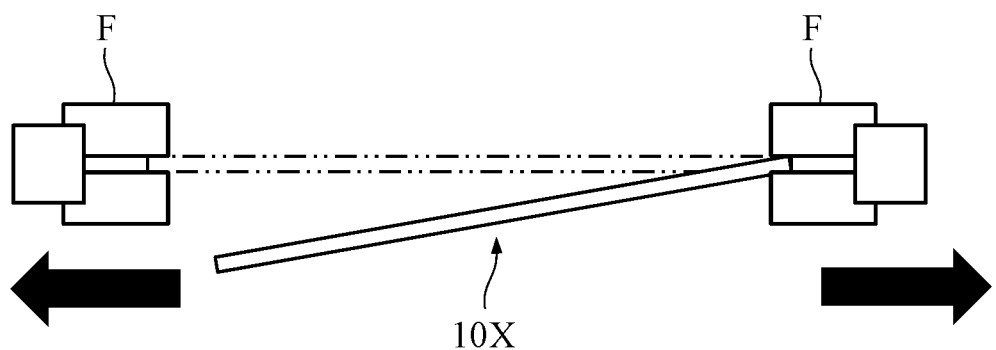
FIG. 5C is a schematic front view illustrating a step of conveying the conventional separator for the fuel cell.

Hereinafter, the function of the fuel cell production method S100 of this embodiment will be described on the basis of comparison with the conventional techniques. FIG. 5A is a schematic plan view illustrating a conventional step of conveying a separator for a fuel cell. FIGS. 5B and 5C are schematic front views each illustrating a conventional step of conveying the separator for the fuel cell.

As illustrated in FIG. 5A, in the conventional step of conveying the separator for the fuel cell, a separator 10X having no bent portion 13 on its peripheral edge is conveyed. Therefore, even if the opposite ends of the sheet-like separator 10X in the longitudinal direction thereof are gripped with the grippers F, it may be difficult to apply sufficient tension to the separator 10X. If sufficient tension cannot be applied to the sheet-like separator 10X, there is a possibility that as illustrated in FIG. 5B, the separator 10X may warp due to its own weight and may flip up while being conveyed, resulting in a failure in the conveyance.

In addition, in the conventional step of conveying the separator for the fuel cell, since the separator 10X having a flat peripheral edge and having no bent portion 13 is conveyed, there may be cases where the frictional resistance between the separator 10X and the grippers F is not sufficient. In such a case, if the opposite ends of the separator 10X in the longitudinal direction thereof are gripped with the grippers F and tension is applied to the separator 10X, there is a possibility that the separator 10X may slip on the grippers F and fall out of the grippers F as illustrated in FIG. 5C, resulting in a failure in the conveyance. In particular, when the separator 10X is conveyed at fast speed, a failure in the conveyance of the separator 10X is likely to occur due to a slip thereof.

In addition, according to the conventional method for producing the fuel cell, since the separator 10X having a flat peripheral edge and having no bent portion is used, there is a possibility that in the step of forming a seal portion between the pair of separators 10X by applying an adhesive to the peripheral edges of the separators 10X, the adhesive applied to the peripheral edges may flow and spread out. Therefore, there is a possibility that the amount of the adhesive that is applied to form a desired seal portion may become excessive.

In contrast, the fuel cell production method S100 of this embodiment includes the conveying step S7 of conveying the sheet-like separator 10 by gripping the opposite ends thereof in the longitudinal direction using the grippers F, and the seal portion forming step S8 of forming the seal portion 17 by joining the pair of separators 10 together using the adhesive 16. However, as described above, the fuel cell production method S100 of this embodiment uses the separators 10 each having the bent portion 13 on its peripheral edge and thus having the recess 14 formed on one surface and the projection 15 formed on the other surface thereof due to the bent portion 13. In addition, in the conveying step S7, the bent portion 13 at the opposite ends of the separator 10 in the longitudinal direction thereof is gripped with the grippers F, and in the seal portion forming step S8, the adhesive 16 is disposed in the recess 14 of the one separator 10A so that the projection 15 of the other separator 10B is fitted in the recess 14.

As described above, in the conveying step S7, as the bent portion 13 at the opposite ends of the separator 10 in the longitudinal direction thereof is gripped with the grippers F, the frictional resistance between the grippers F and the separator 10 is increased by the recess 14 and the projection 15 that are formed on the front and rear surfaces of the peripheral edge of the separator 10 by the bent portion 13. Accordingly, a slip of the separator 10 on the grippers F can be prevented, and the sheet-like separator 10 can be conveyed with sufficient tension applied thereto in the longitudinal direction, and thus, failures in the conveyance of the separator 10 such that the separator 10 warps or flips up can be avoided.

In addition, in the seal portion forming step S8, as the adhesive 16 is disposed in the recess 14 formed by the bent portion 13 of the one separator 10A, the adhesive 16 can be retained in the recess 14 of the one separator 10A, and thus, a flow of the adhesive 16 can be prevented. Accordingly, the amount of the adhesive 16 applied can be reduced than those of the conventional techniques.

Further, in the seal portion forming step S8, as the adhesive 16 is disposed in the recess 14 formed by the bent portion 13 of the one separator 10A, and the projection 15 formed by the bent portion 13 of the other separator 10B is fitted in the recess 14, a part of the seal portion 17 can be formed by the recess 14 and the projection 15 of the pair of separators 10. Accordingly, the amount of the adhesive 16 that is applied to form the seal portion 17 can be reduced.

Furthermore, in the fuel cell production method S100 of this embodiment, the separators 10, each having the bent portion 13 formed continuously along the perimeter direction of the peripheral edge thereof, are used. Accordingly, in the seal portion forming step S8, the seal portion 17 can be formed continuously along the peripheral edges of the separators 10 by the recess 14 and the projection 15 formed continuously along the perimeter directions of the respective separators 10 by their bent portions 13 and by the adhesive 16 disposed therebetween.

Alternatively, in the fuel cell production method S100 of this embodiment, the separators 10, each having the bent portion 13 formed intermittently along the perimeter direction of the peripheral edge thereof, can also be used as illustrated in FIG. 4. Accordingly, in the seal portion forming step S8, the seal portion 17 can be formed between the peripheral edges of the separators 10 by the recess 14 and the projection 15 formed intermittently along the perimeter directions of the respective separators 10 by their bent portions 13, by the adhesive 16 disposed therebetween, and by the opposed surfaces of the pair of separators 10 that are tightly attached together between the bent portions 13.

As a further alternative, in the fuel cell production method S100 of this embodiment, the separators 10, each having the bent portion 13 formed along the entire perimeter of the peripheral edge thereof, are used. Accordingly, in the seal portion forming step S8, the seal portion 17 can be formed along the entire perimeters of the peripheral edges of the separators 10.

Moreover, in the fuel cell production method S100 of this embodiment, the separators 10 each having multiple bent portions 13 formed thereon can also be used as illustrated in FIG. 3 and FIG. 4. Accordingly, in the conveying step S7, the multiple bent portions 13 can be gripped with the grippers F, and thus, the ends of each separator 10 in the longitudinal direction thereof can be gripped more reliably. Further, in the seal portion forming step S8, multiple seal portions 17 can be formed on the peripheral edges of the separators 10 so that the sealability of the peripheral edges of the separators 10 can be improved.

Although the embodiments of the present disclosure have been described in detail with reference to the drawings, the specific configuration is not limited thereto, and the present disclosure includes any design changes that are within the spirit and scope of the disclosure.

DESCRIPTION OF SYMBOLS

10 Separator
10A One of separators
10B The other separator
13 Bent portion
14 Recess
15 Projection
16 Adhesive
17 Seal portion
F Gripper
S7 Conveying step
S8 Seal portion forming step
S100 Fuel cell production method

What is claimed is:

1. A method for producing a fuel cell, comprising:
a conveying step of conveying each of a plurality of sheet-like separators by gripping opposite ends of each separator in a longitudinal direction thereof using grippers; and
a seal portion forming step of forming a seal portion by joining a pair of separators together with an adhesive;
wherein:
the method uses, as each of the separators, a separator that has a bent portion formed into a peripheral edge thereof, the bent portion having a recess and a projection formed on one surface and another surface, respectively, of the separator,
the conveying step includes gripping the bent portion at the opposite ends of each separator using the grippers, and
the seal portion forming step includes disposing the adhesive in the recess of one of the separators and fitting the projection of the other separator in the recess of the one of the separators.

2. The method for producing a fuel cell according to claim 1, wherein the method uses, as each of the separators, a separator that has the bent portion formed continuously along a perimeter direction of the peripheral edge of the separator.

3. The method for producing a fuel cell according to claim 1, wherein the method uses, as each of the separators, a separator that has the bent portion formed intermittently along a perimeter direction of the peripheral edge of the separator.

4. The method for producing a fuel cell according to claim 2, wherein the method uses, as each of the separators, a separator that has the bent portion formed along an entire perimeter of the peripheral edge of the separator.

5. The method for producing a fuel cell according to claim 1, wherein the method uses, as each of the separators, a separator having multiple bent portions formed thereon.

* * * * *